United States Patent [19]
Gadkaree

[11] Patent Number: 6,090,362
[45] Date of Patent: Jul. 18, 2000

[54] METHOD OF PRODUCING FREE-FLOWING CARBON

[75] Inventor: Kishor P. Gadkaree, Big Flats, N.Y.

[73] Assignee: Corning Incorporated, Corning, N.Y.

[21] Appl. No.: 09/115,462

[22] Filed: Jul. 14, 1998

Related U.S. Application Data

[63] Continuation-in-part of application No. 08/859,874, May 21, 1997, abandoned.

[60] Provisional application No. 60/016,085, Jun. 20, 1996.

[51] Int. Cl.[7] .................................................. C01B 31/08
[52] U.S. Cl. ....................................... 423/445 R; 502/423
[58] Field of Search ....................... 264/293; 423/445 R; 502/423, 437

[56] References Cited

U.S. PATENT DOCUMENTS 4,157,314  6/1979  Murty ...................................... 502/425

OTHER PUBLICATIONS

Material Safety Data Sheet, Lion Nokorode Seal Perm, LION / L00128, Seal Perm. Jun. 1993.
Material Safety Data Sheet, Lion Nokorode 124A Emulsion, LION / L00144, 124A Emulsion. Jan. 1996.
Material Safety Data Sheet, Lion Nokorode Low Temp Bedding Compound, LION / L00121, Low Temp Bedding Compound. Jun. 1993.
Material Safety Data Sheet, Lion Nokorode K–Kote, LION/ L) 0124, K–Kote. Jun. 1993.
Coopers Creek Chemical Corporation, Protar 2000. No Date.
Coopers Creek Chemical Corporation, Protar 5000, No Date.

*Primary Examiner*—Steven P. Griffin
*Assistant Examiner*—Stuart L. Hendrickson
*Attorney, Agent, or Firm*—L. Rita Herzfeld

[57] ABSTRACT

Free-flowing carbon and method of producing that involves combining in an aqueous medium, a thermosetting resin carbon precursor and optionally additional carbon precursor which can be petroleum and/or coal tar pitch, filler material at least when the resin is a liquid resin, and oil that is non-reactive with the thermosetting resin and the additional carbon precursor and removable during the curing or carbonizing steps, to form an aqueous mixture, followed by curing and carbonizing to produce free-flowing carbon particles or beads. The carbon can be activated to produce free-flowing activated carbon.

12 Claims, No Drawings

METHOD OF PRODUCING FREE-FLOWING CARBON

This application is a continuation-in-part of application Ser. No. 08/859,874, filed May 21, 1997, which is based upon provisional application No. 60/016,085 filed Jun. 20, 1996, abandoned.

This invention relates to a method of producing carbon from thermosetting resin carbon precursor characterized in that the carbon is non-agglomerated or free-flowing. The carbon is produced by combining thermosetting resin, and optionally petroleum and/or coal tar pitch, non-reactive oil, and filler material at least when a liquid resin is used, in an aqueous medium to coat the filler with the precursor(s), followed by curing, and carbonizing. The carbon is preferably activated to produce free-flowing activated carbon beads.

BACKGROUND OF THE INVENTION

Coating of fibrous or particulate inorganic or organic materials with activated carbon may be desirable for various applications such as reinforcement of matrices, or in some cases where a bed of these particles is used, to remove particulate and dissolved organics from a flow stream in a fluidized bed or packed bed. Particularly, such particles can be useful for water purification where particulate matter as well as organics have to be removed. Such activated carbon beads can also be useful in many pollution control applications where a hydrocarbon (VOC) is to be removed from air with particle beds of such material. The beads can be made of carbon alone without a filler, to obtain purely carbon beads.

Coating of particulates with carbon may be carried out by vapor deposition but this process is too expensive for most applications. Another way to carry out the coating is to coat the particles with a carbon precursor such as a thermosetting resin which is then cured, carbonized, and which can then be activated depending on the application. The obvious method to coat the particles would be to dip the particles in the resin and then try to separate the particles by spray drying or other conventional methods. This cannot be done however, because the resins do not cure till reaction is carried out at about 150° C. for a period of time of about 2 hours. Before cure, the resin remains sticky and the coated particles cannot be separated. A large agglomerated mass is thus obtained. The only way to separate the particles is to grind the mass to a fine particle size. Although this can be done, it is difficult and expensive. Using resins such as phenolic novolaks which are solid powders at room temperature also does not work very well because the fine powders melt and go through a liquid phase at about 80–90° C. at which point they stick together and form a big lump of material which cures at about 125–150° C. Again the grinding and powdering of such a mass is difficult and expensive.

Any of the typical coating processes such as spray drying or fluidized bed coating do not work. The particles agglomerate and lose the free-flowing characteristic. Such agglomerated carbon particles cannot be activated properly, which is important for many applications. The problem of coating becomes more acute with fibrous materials because such materials have a natural tendency to agglomerate due to the inherent high aspect ratio. In addition to the fundamental problem of agglomeration, processes such as spray drying may be too expensive for certain applications.

It is desirable to be able to produce free-flowing activated carbon beads by a simple inexpensive method. The present invention provides such a method.

SUMMARY OF THE INVENTION

In accordance with one aspect of the invention, there is provided free-flowing carbon, that is preferably activated. The activated carbon has an average particle diameter of no greater than about 5 millimeters, and a density, as carbonized, of at least about 100 mg/cc.

In accordance with another aspect of the invention, there is provided a method of producing free-flowing carbon that involves combining in an aqueous medium, a thermosetting resin carbon precursor and optionally additional carbon precursor which can be petroleum and/or coal tar pitch, filler material at least when the resin is a liquid resin, and oil that is non-reactive with the thermosetting resin and the additional carbon precursor and that is removable during the curing and carbonization, to form an aqueous mixture, followed by curing and carbonizing to produce free-flowing carbon particles or beads.

The carbon can be activated to produce free-flowing activated carbon.

DETAILED DESCRIPTION OF THE INVENTION

The present invention relates to a simple and relatively inexpensive method for producing free-flowing, or non-agglomerated carbon. The method involves forming an aqueous mixture by combining a carbon precursor which is thermosetting resin and optional additions of additional precursors of petroleum pitch and/or coal tar pitch, a filler at least when a liquid resin is used, and oil. The oil is non-reactive with the thermosetting resin and additional carbon precursors and removing during subsequent heating steps. These are combined in an aqueous medium, followed by curing and carbonizing the precursor. The carbon is preferably activated to produce activated carbon.

The Carbon Precursor

A important characteristic of the resin is that it be thermosetting. Examples of resins that can be considered suitable to the practice of the present invention are the thermosetting resins such as phenolics, furan and epoxies. It is desirable that the resin give a high carbon yield on carbonization, that is, for example at least about 25%, and preferably at least about 40% based on the amount of cured resin. Thermosetting resins normally give these high yields. Examples of thermosetting resins that can be used in the practice of the present invention are phenolics, furan, and epoxies and combinations of these. Preferred resins are phenolics and furan and combinations of these because of their high carbon yield and low viscosities at room temperature. Normally, the viscosities can vary from about 50 CPS to about 1000 CPS. The preferred viscosities are about 100 to about 500 CPS. The resins can be provided as solids, liquids, solutions, or suspensions.

One resin that is especially suited to the practice of the present invention is phenolic resole. The phenolic resoles are solutions of phenolics in water. One especially suited resin is a phenolic resole resin available from Occidental Chemical Corporation, Niagara Falls, N.Y. under the product name of Plyophen 43290. Plyophen 43290 is a liquid one step phenolic resin containing phenol, formaldehyde, and water, having a specific gravity of 1.22–1.24, a boiling point >100° C. and a pH of 7.5–7.7 @ 100 gm/l. Another suitable phenolic resin is a product available from Borden Chemical Co. with the product name of Durite. This resin is chemically similar to Plyophen resin but has a viscosity of about 300 CPS.

Furan resins are available as liquids. One furan that is suitable to the practice of the present invention is supplied by QO Chemicals, Inc. under the name of Furcarb$^r$ LP. Furcarb$^r$ LP resins are preparations of phenol (4% max) in furfuryl alcohol, and have a specific gravity of 1.2, and a boiling point of 170° C. The viscosity is 300 CPS.

Solid resins such as phenolic novolak are also suitable for use in this invention.

Phenolic molding compounds, which are available commercially, can also be used as a source of the resin. These molding compounds are either resoles or novolaks that have been melt mixed with various mineral, organic and inorganic fillers, such as clay, talc, or wood fiber, usually at about 25 to 70 wt. %, and then partially cured and ground. Such commercial products may be used in the present invention. The solid compounds can be ground to a fine powder for use. Molding compounds available from DUREZ Division of Occidental Chemical Co. such as general purpose compounds, medium impact compounds, glass-filled or heat-resistant electrical grades or compounds identified by numbers such as 32424, 32110, and 18420 can be used. Several molding compounds are available with wood flour, cotton or other type of organic fillers also and such compounds can also be used.

In combination with the resins, petroleum or coal tar pitches can be used as carbon precursors. Some petroleum and coal tar pitch products that can be used, although it is to be understood that these are illustrative and the invention is not limited to such, are discussed below.

Examples of petroleum pitch products are petroleum hydrocarbons and petroleum hydrocarbon emulsions among others, Seal perm, 124A, low temperature compound pitch product, and K-Kote, all supplied by Lion Oil Co., El Dorado, Ark. According to Material Safety Data Sheet L00128, (page 1) from Lion Oil Co., Seal perm petroleum pitch, also designated as Petroleum Asphalt Mastic, contains about 46 wt. % asphalt and about 31 wt. % 300/360 B.R. Naphtha. According to Material Safety Data Sheet L00144, (page 1) from Lion Oil Co., petroleum pitch 124A is an emulsion containing <50 wt. % petroleum asphalt, <5% fillers, <55% water, <10% distilled tall oil, and <0.1% potassium bichromate. According to Material Safety Data Sheet L00121, (page 1) from Lion Oil Co., Low temperature compound pitch product contains about 31 wt. % asphalt, about 25 wt. % 300/360 B.R. Naphtha, and about 5 wt. % 200 Pale Oil. According to Material Safety Data Sheet L00124, (page 1) from Lion Oil Co., K-Kote contains about 43.0 wt. % asphalt, and about 39.0 wt. % 300–360 B.R. Naphtha.

Examples of typical coal tar pitch products are, among others, those from Coopers Creek Chemical Corporation, West Conshohocken, Pa., under the names of Protar 2000 and Protar 5000. According to product data sheets from Coopers Chemical Creek Corporation, these products are refined coal tars produced from selected high temperature coke oven tars. Protar 2000 is described as having a viscosity of 1000–2500 CPS, a maximum water content of 0.50 vol. %, a specific gravity at 77° F. of 1.12–1.20, and a flash point of (Pensky Martins) of 205° F. Protar 5000 is described as having a viscosity of 4000–6000 CPS, a maximum water content of 0.50 vol. %, a specific gravity at 77° F. of 1.14–1.24, and a flash point (Pensky Martins) of 180° F.

The Oil

The oil serves to prevent agglomeration and promote free-flowability. The oil must be inert or non-reactive with the thermosetting resin and other carbon precursors. Additionally, it must be able to be removed during the subsequent heating steps of curing and/or carbonizing. Additionally, the oil must be water immiscible, so that with liquid resins it can form a stable emulsion. With solid resin, a suspension is formed. Some useful oils are petroleum oils with molecular weights from about 250 to 1000, containing paraffinic and/or aromatic and/or alicyclic compounds. So called paraffinic oils composed primarily of paraffinic and alicyclic structures are preferred. These can contain additives such as rust inhibitors or oxidation inhibitors such as are commonly present in commercially available oils. One especially useful oil is 3 in 1 oil from 3M Co. Other useful oils are synthetic oils based on poly alpha olefins, esters, polyalkylene glycols, polybutenes, silicones, polyphenyl ether, CTFE oils, and other commercially available oils. Vegetable oils such as sunflower oil, sesame oil, peanut oil, etc. are also useful. Especially suited are oils having a viscosity of about 10 to 300 CPS, and preferably about 10 to 150 CPS. Preferably the oil makes up no more than about 20% by weight of the total charge of carbon precursor (including additional precursors, and oil, and preferably about 1% to 10%.

The Filler Materials

The filler must be hydrophilic in order to be easily wet by the liquids in the system, or in other words be able to absorb the carbon precursor (liquid). The fillers are most typically an oxygen-containing, e.g. oxide substance, and are therefore relatively inexpensive. Generally the fillers can be carbonizable (organic) and/or inorganic (non-carbonizable), natural or synthetic. The fillers are preferably natural organic or carbonizable fillers. With carbonizable fillers, the carbon content of the particles is increased on carbonization over the carbon that would be present if the filler were inorganic or non-carbonizable. On the other hand, non-carbonizable fillers have the advantage of imparting the characteristic of higher strength to the carbon particles. The fillers can be any combination of the various types so as to take advantage of the properties of each.

Some natural materials are natural powders of soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat straw, wool fibers, corn, potato, rice, and tapioca etc.

Some inorganic fillers that can be used are oxygen containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Preferred organic carbonizable materials are wood and/or nutshell flours, and preferred inorganic materials are clays, talc, cordierite powder, and/or vermiculite.

Some preferred resin-oil-filler mixtures are thermosetting resin such as phenolic resole, oil having a viscosity of about 10 to 300 CPS and preferably about 10 to 150 CPS, and filler. One especially preferred mixture is made up of about 2% to 5 wt. % oil, and about 30% to 70% wt. % filler and the balance being thermosetting resin, e.g. phenolic resole.

The carbon precursor(s), oil, and fillers are combined in an aqueous medium, typically water, to coat the filler with the carbon precursor. This can be done in a number of ways. For example all of the components can be mixed together. Alternately, the precursor and oil can be combined to form an emulsion if the resin is in liquid form such as phenolic resole, or a suspension if the resin is in solid form such as phenolic novolak. This emulsion or suspension can then be combined with the filler. The carbon precursor effectively coats the filler fibers or particles. The oil serves to prevent the coated fibers or particles from attaching to one another. Other components can be included in the mixture to enhance the activation properties of the carbon such a sulfur (about 1–10% by weight based on the resin) or phosphoric acid, (about 1–5% by weight based on the resin).

The precursor is then cured and carbonized, and the carbonized material can be activated. The carbonized (non-activated) material can possibly find use in some applications as reinforcements in structural composites.

The curing is done by heating under the specific temperature and time conditions required for the specific resin. The curing can be done in a conventional oven. Standard curing conditions can be found in the manufacturer's literature. For example, for phenolic resole 43290 from Occidental Chemical Co. the material is heated in air to about 140–155° C. For example, the material is first heated to about 90° C.–100° C. to remove water, then to about 120° C.–130° C. and held at this temperature for about 1–2 hours. It is then heated to about 140° C.–155° C. and held for about 30 minutes-2 hours for final cure. Curing can also be done in a dielectric or microwave oven. During, curing, any water present boils off and possibly the oil, if not in the carbonization step, leaving spherical or elongated particles or beads.

The cured material is then carbonized by heating the particles in an inert or reducing atmosphere such as nitrogen or argon or forming gas. Forming gas is a mixture of nitrogen and hydrogen. Typical mixtures by volume are 92:8 or 94:6 $N_2:H_2$, although any mixtures can be used. Carbonization temperatures are about 600° C.–1000° C. or more typically about 700–1000° C. for a length of time of usually about 1–20 hours. While the particles are in the temperature range of about 300–600° C., the fugitive materials vaporize, such as for example oils that have not burned out in the curing step. During carbonization, low molecular weight compounds separate out and carbon atoms form graphitic structures. For example for phenolic resole resin 43290 from Occidental Chemical Co. and Furan Furcarb resin from QO Chemicals, carbonization is done by heating at a rate of about 150° C./hr in $N_2$. The temperature is held at about 900° C. for about 5–10 hours to complete the carbonization. The temperature is then reduced to 25° C. at a cooling rate of about 150° C./hr. On carbonization, the body contains random three dimensional oriented graphitic platelets with amorphous carbon between the platelets.

The carbonization yields free flowing particles or beads which can have any size and shape, e.g. spherical, elliptical, or fiber. Particle size and shape depends to a large extent on size and shape of the filler because the resin coats the filler particles particularly liquid resins). For example, if large granules are desired, large, i.e. up to about 1 cm. diameter filler particles can be used. If small granules are desired, small size fillers are used. Sizes can be 5 millimeters average diameter, or less, and even as low as about 1 micrometer average diameter. When no filler is used, solid resin particle size determines the carbon particle size.

After curing or carbonization, if desired, a mild separating force can be applied to the particles or platelets, such as very mild shearing action.

Free-flowability is determined by pouring the carbon and visually observing whether or not the flow is uniform and continuous, and whether or not they agglomerate.

Because the material is free-flowing, it activates more easily and efficiently than carbon made from resin alone, i.e., without oil, or in some cases without oil and filler, which is often in the form of solid hard chunks which cannot be activated. The activation is done by partially oxidizing in a suitable oxidant such as $CO_2$, steam, air, or a combination of these, etc. Activation can be carried out at temperatures between about 700° C.–1000° C. Activation conditions depend on type and amount of resin, flow rate of gas, etc. For example for phenolic resole and Furcab resins activation conditions are at about 900° C. for about 1–5 hours in $CO_2$ at a flow rate of about 14.2 l/hr. (about 0.5 CFH (ft.$^3$/hr.)). The partial oxidation during activation causes the removal of the amorphous carbon and the formation of molecular size porosity between the graphitic platelets. This porosity and the graphitic platelets impart adsorption characteristics to the resulting activated carbon particles.

The density of the carbon (measured as carbonized, although it does not change significantly on activation) is typically >50 mg/cc, and more typically >100 mg/cc. The density can be as high as 1260 mg/cc, or higher.

The method of this invention which includes oil and filler provides a simple way to make carbon particles. Such particles are produced directly on carbonization and optionally activation, and there is no need for subsequent grinding operations to obtain particles.

To more fully illustrate the invention, the following non-limiting examples are presented. All parts, portions, and percentages are on a weight basis unless otherwise stated.

EXAMPLE 1

Phenolic resole resin was first mixed with mineral lubricating oil from 3M Co to make a resole resin-oil emulsion of about 5% oil. This emulsion was then mixed with wood fiber from American Wood Fibers, Schofield, Wis. (grade 2010 and 4010 hardwood). The fiber to resin-oil emulsion weight ratio was about 10:2.1. The fiber and resin-oil emulsion was heated to dry and cure. On cure, the fiber was uniformly coated with resin. The coated fiber was then carbonized to obtain a strong carbon fiber. The coated cured product was activated at about 850° C. in carbon dioxide to obtain the activated carbon beads. The density was about 1260 mg/cc.

EXAMPLE 2

Hollow inorganic spherical particulate material from 3M used for water filtration with a diameter of about 50 micrometers was coated with a resin-oil emulsion similar to that in Example 1, in a 10:1.25 ratio of particulate material to resin. The mixture was cured, carbonized, and activated to obtain free flowing spherical particles of the inorganic spherical particulate coated with activated carbon.

EXAMPLE 3

A mixture of about 40% phenolic resin, about 10% petroleum pitch 124A and about 2% oil was made up and to this mixture was added about 48% hardwood fiber to make the final mixture. This final mixture was hand mixed and cured at about 150° C. On curing, the resulting coated fibers easily separated. The fibers were carbonized in nitrogen at about 900° C. for about 5 hours. The resulting free-flowing carbonized fibers were then activated in $CO_2$ for about 1 hour at about 900° C. to obtain the activated carbon product.

EXAMPLE 4

The procedure of Example 3 was repeated except that K-coat petroleum pitch product from Lion Oil Co. was used as the source of petroleum pitch.

EXAMPLE 5

The procedure of Example 3 was repeated except that a coal tar pitch product Protar 5000 from Coopers Creek Chemical Corporation, Pa. was used instead of petroleum pitch.

EXAMPLE 6

Solid phenolic novolak powder from Occidental Chemical Co., N.Y. was mixed with an oil-water emulsion made up of about 5% oil and 95% water, in a 1:2 ratio of solid resin to emulsion. The solid resin-oil-water mixture was cured at about 150° C. and then carbonized and activated to obtain activated carbon beads The activated carbon beads made according to this invention can be mixed with an appropriate amount of binders such as polyurethane suspensions or solutions and pressed into patties to make filtration products to remove odors or VOC's from various flow streams.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of producing free-flowing carbon, the method comprising:

a) combining in an aqueous medium, a thermosetting resin as a carbon precursor, and optionally, additional carbon precursor selected from the group consisting of petroleum pitch, coal tar pitch and combinations thereof, filler material at least when the resin is a liquid resin, oil that is non-reactive with said thermosetting resin and said additional carbon precursor, and removable during the subsequent curing or carbonizing steps;

b) curing the resin; and c) carbonizing the cured resin.

2. A method of claim 1 comprising the additional step of activating the carbon to form a free-flowing activated carbon.

3. A method of claim 1 wherein the amount of oil is no greater than about 20% by weight based on the total weight of the thermosetting resin, additional precursor and the oil.

4. A method of claim 3 wherein said amount of oil is about 1% to 10%.

5. A method of claim 1 wherein the oil has a viscosity of about 10 to 300 CPS.

6. A method of claim 5 wherein the oil has a viscosity of about 10 to 150 CPS.

7. A method of claim 1 wherein the thermosetting resin is selected from the group consisting of phenolic resins, furan resins, and combinations thereof.

8. A method of claim 7 wherein the resin is phenolic resole.

9. A method of claim 1 wherein the filler is selected from the group consisting of wood flour, nutshell flour, clay, talc, cordierite powder, vermiculite, and combinations thereof.

10. A method of claim 1 wherein the filler is carbonizable.

11. A method of claim 9 wherein the filler is selected from the group consisting of wood flour, nutshell flour, and combinations thereof.

12. A method of claim 8 wherein the aqueous mixture consists essentially of in percent by weight about 2% to 5% by weight oil, about 30% to 70% filler and the balance being phenolic resole.

* * * * *